3,657,327
PROSTAGLANDIN SALTS OF TRIS(HYDROXY-
METHYL)AMINOMETHANE
Walter Morozowich, Kalamazoo, Mich., assignor to The
Upjohn Company, Kalamazoo, Mich.
No Drawing. Filed June 1, 1970, Ser. No. 42,458
Int. Cl. C07c 91/02
U.S. Cl. 260—501.17                          6 Claims

ABSTRACT OF THE DISCLOSURE

Free flowing crystals of the tris(hydroxymethyl)aminomethane salts of $PGE_2$ and $PGF_{2\alpha}$, and processes for producing those, are disclosed. Those crystals are useful for the same pharmacological and medical purposes as $PGE_2$ and $PGF_{2\alpha}$, and are also useful as a means for purifying $PGE_2$ and $PGF_{2\alpha}$.

---

This invention relates to novel manufactures and to novel methods for producing those. In particular, this invention relates to free flowing crystals of the tris(hydroxymethyl)aminomethane salt of a compound of the formula:

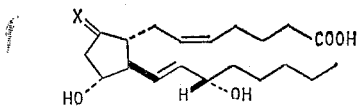

wherein X is =O or

and to methods for making those crystals.

The compound of Formula I wherein X is =O is an optically active compound known as prostaglandin $E_2$ ($PGE_2$). The compound of Formula I wherein X is

is an optically active compound known as prostaglandin $F_{2\alpha}$ ($PGF_{2\alpha}$). These compounds are known to be useful for a variety of pharmacological and medical purposes, for example, labor induction and abortion in pregnant animals, including humans. For these purposes, the usual route of administration is intravenous injection or infusion.

These Formula I carboxylic acids do not dissolve readily in water or the isotonic solutions necessary for intravenous injection or infusion. Preliminary treatment of the prostaglandin with a water-miscible organic solvent and/or an aqueous solution of a base, for example, sodium hydroxide or sodium carbonate, is usually necessary before an isotonic aqueous solution of the proper concentration can be formed. Moreover, $PGF_{2\alpha}$ is a low-melting waxy solid which is difficult to solidify and purify, and which is slow in dissolving an aqueous base solutions. Although $PGE_2$ is a crystalline solid, it also is slow to dissolve in aqueous base solutions. Thus, these two compounds are difficult to transform into useable pharmaceutical formulations for intravenous injection or infusion.

$PGE_2$ and $PGF_{2\alpha}$ are carboxylic acids, and salt formation is involved when $PGE_2$ or $PGF_{2\alpha}$ is dissolved in aqueous base solutions as a preliminary step in the known formulation procedures. See also British specification 1,040,544 where pharmacological and medical use of $PGE_2$ and $PGF_{2\alpha}$ in pharmacologically acceptable salt form is suggested. Among the pharmacologically acceptable cations suggested there are those derived from the alkali and alkaline earth metals, ammonia, and various amines.

There would be substantial advantage in having available $PGE_2$ and $PGF_{2\alpha}$ each in the form of a stable, crystalline, high-melting salt which is rapidly soluble in water or in the isotonic solutions necessary for intravenous administration. There would also be substantial advantage in being able to recrystallize those same salts to produce preparations of the desired degree of purity. This would be especially desirable for $PGF_{2\alpha}$ which, as mentioned above, is difficult to purify as a free acid.

I have now made the surprising and unexpected discovery that free-flowing crystals of the tris(hydroxymethyl)aminomethane salts of $PGE_2$ and $PGF_{2\alpha}$ are produced by mixing a dilute acetonitrile solution of the prostaglandin in the range 65° to 85° C. with a concentrated aqueous solution of an equivalent amount of tris(hydroxymethyl)aminomethane, cooling the resulting mixture to the range 20° to 30° C., maintaining the mixture in the range 20° to 30° C. until crystals are formed, and collecting said crystals. These free flowing salt crystals are non-hydrogoscopic, easily dried, free of water and acetonitrile solvate molecules, and recrystallizable. They also dissolve rapidly and completely in water and in the usual isotonic solutions used for intravenous injection or infusion, and are useful for the same pharmacological and medical purposes as $PGE_2$ and $PGF_{2\alpha}$.

Production of these free flowing crystalline tris(hydroxymethyl)aminomethane salts of $PGE_2$ and $PGF_{2\alpha}$ is especially surprising and unexpected since these salts are uniformly oils when prepared by the conventional methods for making amine salts of carboxylic acids. Those oils are difficult to handle and purify, and are slow to dissolve in water and isotonic solutions.

In carrying out the novel process of this invention, it is desirable to use equivalent amounts of the prostaglandin and the tris(hydroxymethyl)aminomethane. The latter is rather insoluble in acetonitrile and an excess will precipitate with and contaminate the desired salt. Using less than an equivalent amount of the amine will result in part of the prostaglandin staying in the acetonitrile.

As mentioned above, the salt formation and crystallization occurs in a mixture of acetonitrile and water. It is important that the proportions of acetonitrile and water be such that the maximum amount of salt crystallizes from the solvent mixture. Enough water must be used, of course, to form and transfer a homogeneous solution of tris(hydroxymethyl)aminomethane to the acetonitrile solution of the prostaglandin. But use of water substantially above that minimum amount will require use of excessive amounts of acetonitrile. For each volume of water, about 100 to 200 volumes of acetonitrile should be used. Use of substantially less acetonitrile will result in a mixture of acetonitrile and water which will unnecessarily retain the desired salt in solution. Use of larger amounts of acetonitrile would be unnecessary and wasteful of the actonitrile. A convenient and suitable amount of water is about 3 milliliters per gram of tris(hydroxymethyl)aminomethane. Not much less can be used because of the solubility of that amine in water (about 0.5 gram per ml. at 25° C.). Use of more water will require an unnecessarily large amount of acetonitrile.

The acetonitrile solution of the prostaglandin should be in the range 65° to 85° C. when it is mixed with the aqueous tris(hydroxymethyl)aminomethane solution. It is advantageous to heat the acetonitrile solution to about its boiling point, i.e., about 80° C. at atmospheric pressure. To minimize degradation of the prostaglandin, heating should be rapid and mixing with the aqueous amine solution should be done promptly when the acetonitrile solution is at the desired temperature. It is advantageous though not necessary to warm the aqueous amine solution to the range 50° to 80° C. before mixing.

The aqueous amine solution is advantageously added slowly and with vigorous stirring to the hot acetonitrile solution. The resulting hot mixture is then cooled rapidly to room temperature (about 20° to 30° C.). A cool water bath is useful for this cooling.

When this process is first carried out, it is advantageous to do it in a glass vessel, the inner walls of the vessel being scratched vigorously with a glass rod when the mixture just starts to become cloudy. Doing that will hasten crystal formation. In subsequent operations, a few crystals from this first crystallization can be added as seeds at the same point of initial clouding to hasten crystal formation, and a glass vessel need not be used.

After this initial cooling, the mixture is maintained at room temperature (about 20° to 30° C.) until no further crystallization occurs. The crystals are then collected by conventional techniques, e.g., filtration or centrifugation, and washed with a small amount of acetonitrile. Most of the acetonitrile is removed either under reduced pressure or in a current of warm nitrogen or argon. The crystals are then ground to a finer particle size if desired, and drying is completed by heating in the range 50 to 75° C.

When recrystallization of the tris(hydroxymethyl)-aminomethane salt of $PGE_2$ or $PGF_{2\alpha}$ is desired, that is advantageously done by dissolving the salt in a small amount of water (1 to 3 ml. of water per g. of salt), adding that solution with vigorous stirring to hot acetonitrile (65 to 85° C.; about 200 ml. per g. of salt), and cooling the resulting mixture to room temperature (20 to 30° C.), advantageously adding a few crystals at the cloud point to assure prompt crystallization. The crystals are collected, washed, and dried as above.

It is advantageous although not essential to carry out all of the above operations with minimum exposure to oxygen by replacing air with an inert gas, for example, nitrogen or argon.

When recovery of $PGE_2$ or $PGF_{2\alpha}$ from their respective tris(hydroxymethyl)aminomethane salts is desired, that is accomplished by dissolving the salt in water (10 ml. per g. of salt), adjusting the pH of that solution to the range 6 to 7, and extracting the solution repeatedly with ethyl acetate. The ethyl acetate extracts are combined, washed successively with water and saturated aqueous sodium chloride solution, dried, and evaporated to give $PGE_2$ or $PGF_{2\alpha}$.

The invention can be more fully understood by the following examples:

EXAMPLE 1

*Free flowing crystals of the tris(hydroxymethyl)-aminomethane salt of $PGF_{2\alpha}$*

A solution of tris(hydroxymethyl)aminomethane (1.645 g.) in 3.0 ml. of water at 60° C. is added with vigorous stirring to a solution of $PGF_{2\alpha}$ (5.00 g.) in 700 ml. of acetonitrile which has just been brought to its boiling point. The vessel which contained the aqueous amine solution is rinsed with three 0.66-ml. portions of water, each rinsing being added with vigorous stirring to the acetonitrile solution. The mixture is then cooled to 25° C. by immersion of the vessel in cool water. At the cloud point, the vessel wall (glass) below the liquid surface is scratched vigorously with a glass rod. The mixture is then maintained at 25° C. for 24 hours. The resulting crystals are collected by filtration under nitrogen, washed on the filter with 50 ml. of acetonitrile, and then dried by passing nitrogen at 50° C. through the filter cake for one hour. Drying is completed in an oven at 70° C. for 8 hours to give 5.965 g. of the tris(hydroxymethyl)aminomethane salt of $PGF_{2\alpha}$ in free flowing crystalline form; M.P. 100–101° C.

Following the procedure of Example 1 but using a few crystals of the product of Example 1 in place of scratching with a glass rod, the same salt in free flowing crystalline form and with the same melting point is obtained.

EXAMPLE 2

*Free flowing crystals of the tris(hydroxymethyl)-aminomethane salt of $PGE_2$.*

Following the procedure of Example 1 but using $PGE_2$ in place of $PGF_{2\alpha}$, free flowing crystals of the tris(hydroxymethyl)aminomethane salt of $PGE_2$ are obtained.

I claim:

1. As a manufacture, free-flowing crystals of the tris(hydroxymethyl)aminomethane salt of a compound of the formula:

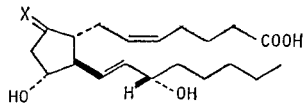

wherein X is =O or

2. Free-flowing crystals of the tris(hydroxymethyl) aminomethane salt of $PGF_{2\alpha}$, a manufacture according to claim 1 wherein X is

3. Free-flowing crystals of the tris(hydroxymethyl) aminomethane salt of $PGE_2$, a manufacture according to claim 1 wherein X is =O.

4. A process for producing free flowing crystals of the tris(hydroxymethyl)aminomethane salt of a compound of the formula:

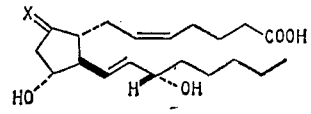

wherein X is =O or

which comprises the steps, (1) mixing a dilute acetonitrile solution of said compound in the range 65 to 85° C. with a concentrated aqueous solution of an equivalent amount of tris(hydroxymethyl)aminomethane, (2) cooling the resulting mixture to the range 20 to 30° C., (3) maintaining the mixture in the range 20° to 30° C. until crystals have formed, and (4) collecting said crystals.

5. A process according to claim 4 wherein X is

6. A process according to claim 4 wherein X is =O.

References Cited

UNITED STATES PATENTS 3,598,858   8/1971   Bergstrom et al. _____ 260—468

LEON ZITVER, Primary Examiner

M. W. GLYNN, Assistant Examiner

U.S. Cl. X.R.

260—514 R; 424—316

UNITED STATES PATENT OFFICE
CERTIFICATE OF CORRECTION

Patent No. 3,657,327  Dated  April 18, 1972

Inventor(s) Walter Morozowich

It is certified that error appears in the above-identified patent and that said Letters Patent are hereby corrected as shown below:

Column 1, line 56, for "an aqueous" read -- inaqueous --. Column 2, line 18, for "hydrogoscopic" read -- hygroscopic --; line 25, for "$PGF_{2a}$" read -- $PGF_{2\alpha}$ --; line 53, for "actonitrile" read -- acetonitrile --. Column 3, line 65, for "filler" read -- filter --. Column 4, line 55, for "  " read --  --.

Signed and sealed this 25th day of July 1972.

(SEAL)
Attest:

EDWARD M. FLETCHER, JR.          ROBERT GOTTSCHALK
Attesting Officer                Commissioner of Patents